P. DOERN.
WALL CONSTRUCTION.
APPLICATION FILED SEPT. 30, 1916.

1,271,447.

Patented July 2, 1918.
2 SHEETS—SHEET 1.

Inventor
Peter Doern
By
Conrad A. Dieterich
his Attorney

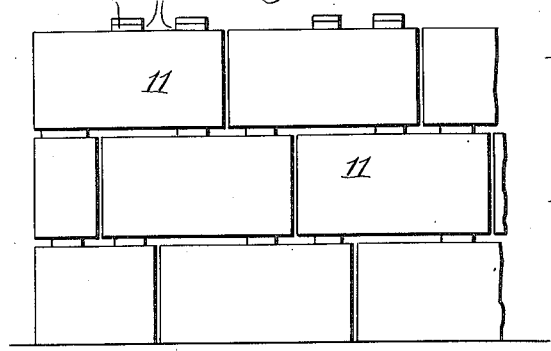
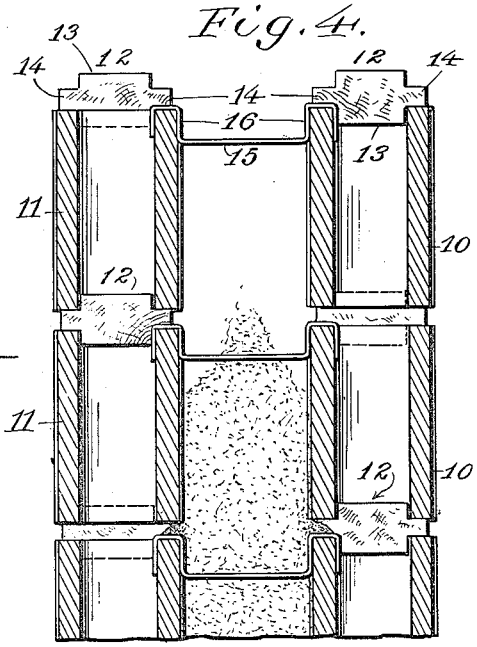
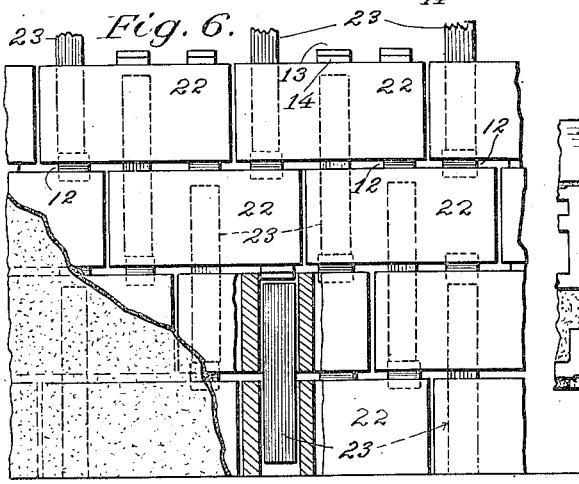
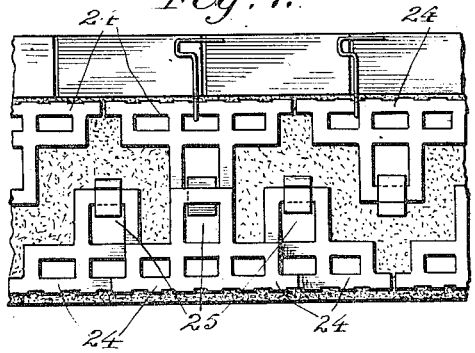
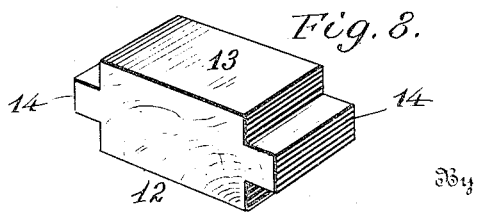
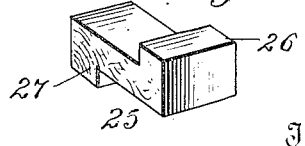

UNITED STATES PATENT OFFICE.

PETER DOERN, OF NEW ROCHELLE, NEW YORK.

WALL CONSTRUCTION.

1,271,447.

Specification of Letters Patent.

Patented July 2, 1918.

Application filed September 30, 1916. Serial No. 123,005.

*To all whom it may concern:*

Be it known that I, PETER DOERN, a citizen of the United States, residing at New Rochelle, Westchester county, in the State of New York, have invented certain new and useful Improvements in Wall Constructions, of which the following is a full, clear, and exact specification.

This invention relates to improvements in wall constructions and has for its object to provide a wall which is weather and moisture proof.

Further, the invention has for its object to provide a wall having inner and outer wall members formed of hollow blocks and having a filling material between the wall members.

Further, the invention has for its object to provide a wall in which the blocks of adjacent courses are spaced from and alined with one another by means of spacing and alining members.

Further, the invention has for its object to provide a wall having inner and outer wall members maintained in spaced relation to one another by means of tie members.

Further, the invention has for its object to provide a wall having a wall member and an outer facing secured thereto by bonding members.

Further, the invention has for its object to provide a wall member formed of hollow blocks and having members positioned within the openings in the blocks of adjacent courses for the purpose of strengthening or reinforcing the wall structure as a whole.

Other objects will in part be obvious, and in part be pointed out hereinafter.

To the attainment of the aforesaid objects and ends, my invention consists in the novel details of construction, and in the combination, connection and arrangement of parts, hereinafter more fully described and then pointed out in the claims.

In the accompanying drawings showing several illustrative embodiments of the invention—

Fig. 3 is a side elevational view thereof;

Fig. 4 is a vertical sectional view thereof;

Fig. 5 is a plan view of a portion of a modified form of wall;

Fig. 6 is a side elevational view thereof;

Fig. 7 is a horizontal sectional view of a wall of slightly modified form;

Fig. 8 is a perspective view of one form of the spacing and alining blocks, and

Fig. 9 is a similar view showing a modified form of spacing and alining blocks.

Figure 1:
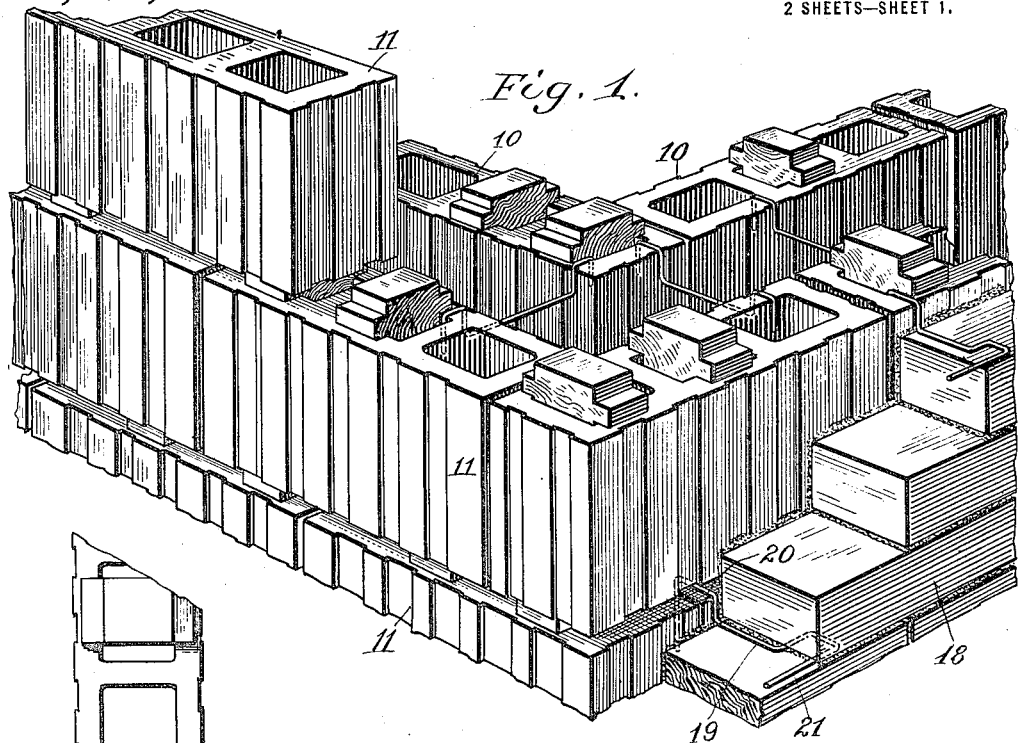
Figure 1 is a perspective view showing a portion of a wall constructed in accordance with the invention.
Figure 2:
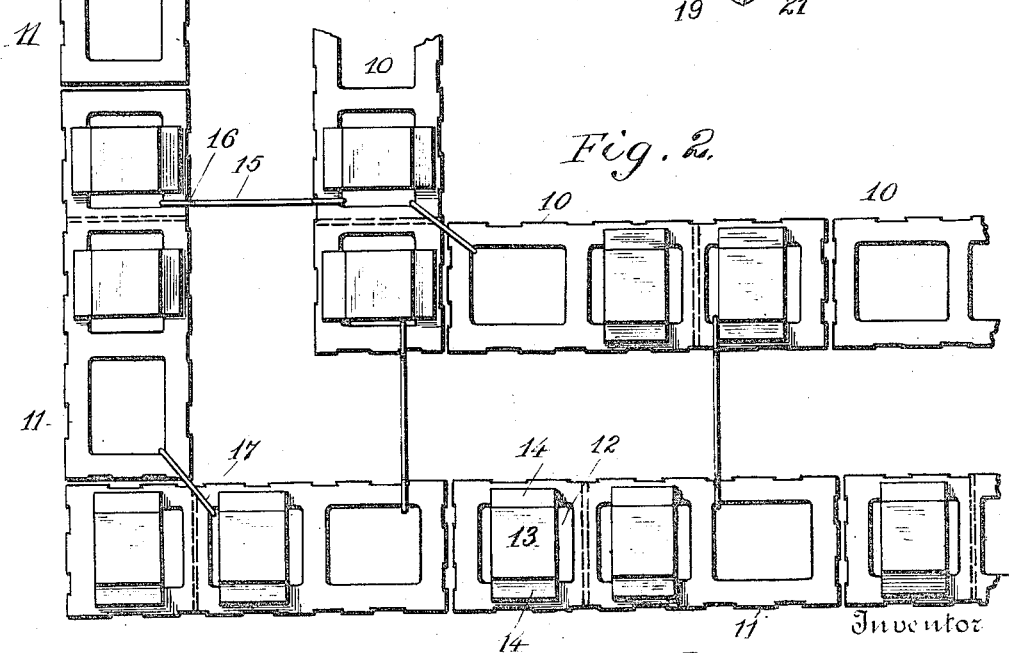
Fig. 2 is a plan view of the wall shown in Fig. 1, the outer facing blocks being omitted.

Referring to Figs. 1, 2, 3 and 4 of the drawings there is shown a wall comprising an inner wall member formed of hollow blocks 10, and an outer wall member formed of hollow blocks 11, the blocks of each wall member being laid in courses, as shown.

In order to space and aline the blocks of each course from the blocks of adjacent courses, spacing and alining members 12 are employed each of which comprises a central body portion 13 and laterally extending projections 14 of less height than the height of the body portion 13 and having their upper and lower surfaces positioned respectively in planes below and above the planes of the upper and lower surfaces of the body portion 13, as clearly shown in Fig. 8. When the hollow blocks 10 and 11 of one course have been laid the members 12, are placed in position with the projections 14 resting upon the upper surfaces of the front and rear sides of the blocks 10 and 11 and with the lower portions of the body portions 13 extending downwardly into the openings which extend through the blocks 10 and 11. The blocks of the next course are then placed in position with the lower surfaces of their front and rear sides resting upon the projections 14 of the members 12, the upper portions of the body portions 13 extending upwardly into the openings of the blocks 10 and 11. It will thus be seen that the blocks of the upper course will be spaced from the blocks of the lower course by the projections 14 of the members 12 and that the blocks of the upper course will be properly alined with respect to the blocks of the lower course by reason of the fact that the body portions 13 of the members 12 extend downwardly and upwardly into the openings in the blocks of the two courses, it being of course understood that the width of the body portions 13 is substantially equal to the width of the openings in the blocks 10 and 11. By repeating the operations, above described, the wall may be built up to any desired height.

In order to maintain the outer and inner wall members in proper spaced relation to one another tie rods 15 are provided having their ends bent upwardly, outwardly and downwardly to form hooks 16 which, when the tie rods are placed in position with respect to each course, rest upon the upper surfaces of the blocks 10 and 11 with their free ends extending downwardly into the openings of the blocks 10 and 11, as clearly shown in Fig. 1.

The blocks forming the corner of the wall members are preferably tied together by substantially U-shaped tying members 17 which are placed in position with their transverse portions resting upon the upper surfaces of the blocks and with their free ends extending downwardly into the openings therein.

During the construction of the inner and outer wall members, or after they have been constructed, a filling material such as cement or concrete is poured into the space between them and as the space is filled the material will flow into, and fill the spaces between the blocks 10 and 11 of the several courses.

A coating of plaster or the like may be applied to the inner surface of the inner wall member, as shown in Fig. 7, and the outer surface of the outer wall member may be provided with an outer facing of bricks 18 or the like, as shown in Fig. 1. In order to form a more perfect union between this outer facing and the outer wall member bonding members 19 are employed the inner ends of which are provided with hooks 20, similar to the hooks 16 of the tie members 15, for engaging with the blocks 11 and the outer ends of which are bent to form hooks 21 adapted to lie between the bricks 18 of successive courses and having a free end adapted to extend over the abutting end portions of adjacent bricks of a course. The bonding members 19 will be embedded within the cement or mortar which is used to retain the bricks 18 in position thereby effecting a firm tie between the outer facing and the outer wall member. The outer facing is preferably spaced slightly from the outer wall member to permit cement or concrete to be poured therebetween.

Referring to Figs. 5 and 6 there is shown a wall consisting of a single wall member formed of hollow blocks 22 which are maintained in spaced and alined relation to one another by means of spacing and alining members 12, as above described, with respect to the wall shown in Figs. 1, 2, 3 and 4. In order to strengthen the wall, strengthening members 23 of any suitable material are inserted within the openings of the blocks 22 of two adjacent courses and rest upon the members 12 or upon the surfaces of the abutting ends of adjacent blocks 22 in the next lower course. These strengthening members 23 extend substantially throughout the height of two of the blocks 22 and are of substantially the same cross-sectional area as the openings in the blocks whereby the superimposed courses will be firmly secured together to give the wall rigidity without the use of a binding medium. After the wall is thus built the sides thereof may be faced with any suitable material which will fill the spaces between adjacent blocks thereby cementing them together.

In Fig. 7 there is shown a wall similar to that shown in Fig. 1 but in which the hollow blocks 24 are T-shaped instead of rectangular. In this wall construction the courses are so laid that the inner walls of the blocks forming each course of the inner and outer wall members will register with the inner walls of the blocks forming the next lower course of the outer and inner wall members respectively. The blocks 24 are maintained in spaced and alined relation by means of spacing and alining members having a body portion 25 and upwardly and downwardly extending projections 26 and 27. (See Fig. 9). These members are so positioned that the lower surfaces of the body portions 25 will rest upon the upper surfaces of the rear walls of the blocks 24 of one course and their upper surfaces will be engaged by the lower surfaces of the rear walls of the blocks of the next course, whereby the courses will be spaced from one another. The projections 26 and 27 will extend into the openings of the blocks forming the upper and lower courses to maintain them in alinement, it being remembered that if the projection 27 of one of the members extends downwardly within the opening of a block forming a part of the inner wall member, the projection 26 will extend upwardly within the opening of a block forming a part of the outer wall member, and vice versa. In other respects the wall is constructed in the manner, above described, with respect to Figs. 1, 2, 3 and 4.

It will, of course, be understood that the strengthening members 23 shown in Fig. 6 could be used in connection with either or both of the wall members shown in Figs. 1 and 7, if so desired.

Having thus described my said invention what I claim and desire to secure by Letters Patent is:—

1. A wall comprising inner and outer wall members formed of hollow blocks laid in courses, spacing members interposed between the blocks of adjacent courses constituting said wall members, and tie members extending between said wall members and provided with end portions embracing the upper portions of the inner side walls of the blocks, the thickness of said tie members being less than the height of said spacing members, substantially as specified.

2. A wall comprising inner and outer wall members formed of hollow blocks laid in courses, spacing and alining members operatively associated with the blocks of adjacent courses constituting said wall members, each of said spacing and alining members comprising a body portion extending within the openings of the blocks of adjacent courses and laterally extending projections extending between the blocks of adjacent courses, said projections being of less height than said body portion, and tie members extending between said wall members and provided with end portions embracing the upper portions of the inner side walls of the blocks, the thickness of said tie members being less than the height of the projections of said spacing and alining members, substantially as specified.

Signed at the city of New York, in the county and State of New York, this 6th day of September one thousand nine hundred and sixteen.

PETER DOERN.

Witnesses:
CONRAD A. DIETERICH,
HAMILTON ANDERSON.